(No Model.) 2 Sheets—Sheet 1.
L. L. BARBER
TRIMMING ATTACHMENT FOR SEWING MACHINES.
No. 247,290. Patented Sept. 20, 1881.
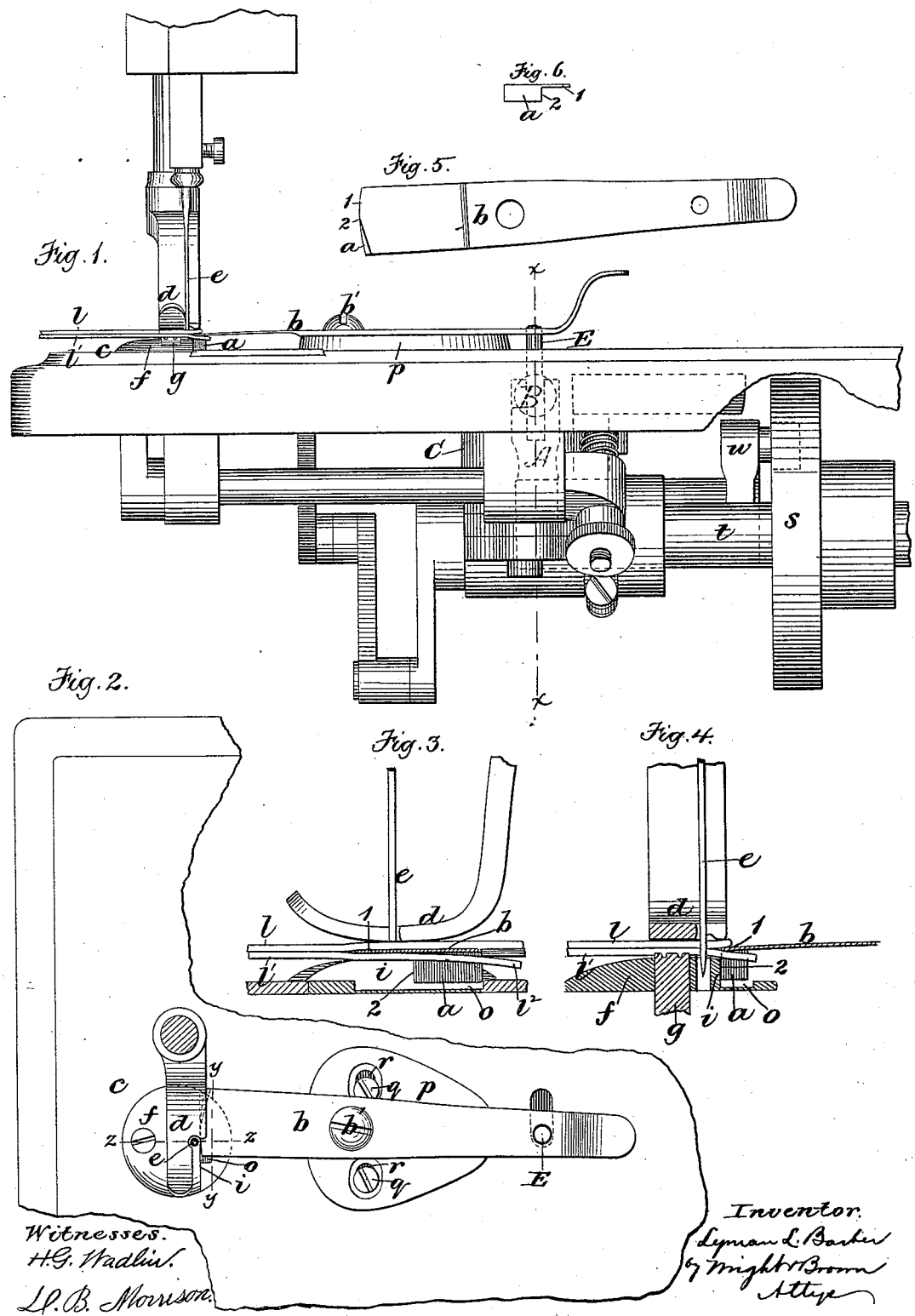
Witnesses.
H. G. Wadlin.
L. P. B. Morrison.
Inventor.
Lyman L. Barber
by Wright & Brown
Attys.

(No Model.) 2 Sheets—Sheet 2.
L. L. BARBER
TRIMMING ATTACHMENT FOR SEWING MACHINES.
No. 247,290. Patented Sept. 20, 1881.
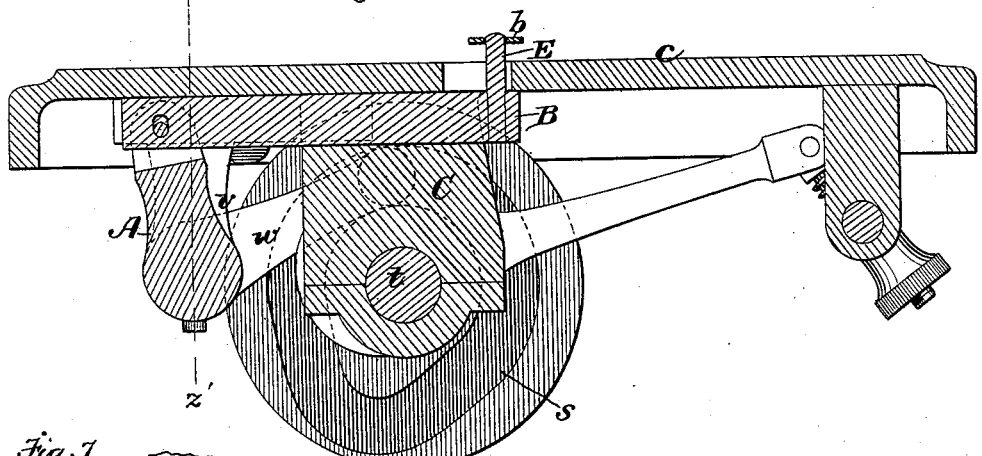
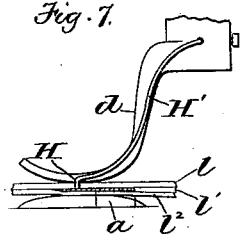
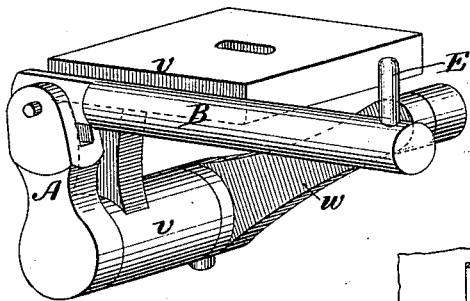
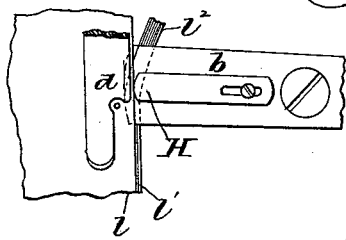
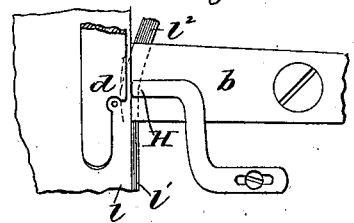
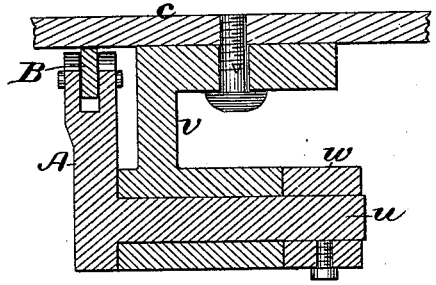
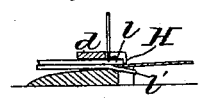
Witnesses:
H. G. Wadlin
L. B. Morrison
Inventor
Lyman L. Barber
by Wright Brown
Attys

UNITED STATES PATENT OFFICE.

LYMAN L. BARBER, OF BOSTON, MASSACHUSETTS, ASSIGNOR TO THE BARBER TRIMMER COMPANY, OF PORTLAND, MAINE.

TRIMMING ATTACHMENT FOR SEWING-MACHINES.

SPECIFICATION forming part of Letters Patent No. 247,290, dated September 20, 1881.

Application filed July 13, 1881. (No model.)

*To all whom it may concern:*

Be it known that I, LYMAN L. BARBER, of Boston, in the county of Suffolk and State of Massachusetts, have invented certain Improvements in Trimming Attachments for Sewing-Machines, of which the following is a specification.

This invention relates to cutting or trimming attachments for sewing-machines, in which the cutter or trimmer is a knife reciprocating in a line parallel with the direction of the feed and adapted to trim the edge of the material being sewed in a line parallel with the stitching, as shown in Letters Patent of the United States issued to me October 27, 1874, and reissued August 28, 1877.

The present invention has for its object to enable the reciprocating knife to trim only one of two superposed layers or thicknesses of material, leaving the other layer or thickness uncut, the invention being intended for trimming the linings of certain kinds of boot or shoe uppers in which the outer portion is piped, folded, or otherwise finished at its outer edge before the lining is stitched to it.

To this end the invention consists in the hereinafter-described improvements in the knife and its co-operating devices.

Of the accompanying drawings, forming part of this specification, Figure 1 represents a side elevation of a portion of a sewing-machine embodying my invention. Fig. 2 represents a top view of a portion of the bed of the machine, showing the shank of the knife, the presser-foot, and the throat-plate. Figs. 3 and 4 represent, respectively, enlarged sections on lines $y\,y$ and $z\,z$, Fig. 2. Figs. 5 and 6 represent, respectively, bottom and end views of the knife and its shank. Fig. 7 represents a side view of the presser-foot, showing a gage to limit the distance between the edge of the outer layer of material and the line of stitching. Figs. 8, 9, and 10 represent modifications of said gage. Fig. 11 represents a section on line $x\,x$, Fig. 1. Fig. 12 represents a perspective view of a part of the mechanism for reciprocating the trimming-knife. Fig. 13 represents a section on line $z'\,z'$, Fig. 11.

The same letters indicate the same parts in all the figures.

In the drawings, $c$ represents the bed of a sewing-machine. $d$ represents the presser-foot, $e$ the needle, $f$ a throat-plate under the presser-foot, and $g$ the feed-dog in said throat-plate.

$a$ represents the trimming-knife, which is formed on the end of a pivoted shank, $b$, and projects downwardly therefrom, and is located under the presser-foot. The shank $b$ is raised above the bed $c$, so that sufficient space is afforded between said shank and bed for one of the layers of material, the other layer being above the shank. The shank $b$ is pivoted at $b'$ to a fixed support, and is oscillated horizontally by suitable connections with the driving-shaft, as hereinafter described, thereby reciprocating the knife in a direction substantially parallel with the direction of the feed of the machine, and enabling the knife to trim the edge of a piece of material while the same is being stitched, and in a line parallel with the line of stitching. The end of the shank on which the knife is formed constitutes a lip or guard, 1, over the cutting-edge 2 of the knife, and projecting forward from the same. The shank $b$ is made thin at its end which carries the knife, and constitutes a spring which enables the knife to have a vertically-yielding movement.

The throat-plate $f$ is cut away to form a vertical wall, $i$, with which the edge of the knife is in rubbing contact when it is reciprocated.

The work to be stitched by the machine is composed of the superposed layers of material $l\,l'$, which represent, respectively, the outer portion and lining of a boot or shoe upper. These layers are suitably secured together by cement or otherwise previous to the stitching operation, the outer portion, $l$, being turned, piped, or otherwise finished at its outer edge, as usual, and the lining $l'$ being unfinished, and usually projecting more or less beyond the edge of the outer portion.

The work thus prepared is placed under the presser-foot, as usual, and the lip or guard 1 of the knife is interposed between the layers $l\,l'$, as shown in Figs. 1, 3, and 4, so that the knife can act only on the inner layer or lining, $l'$, the outer layer being interposed between the presser-foot and the lip or guard. The operation of the machine in stitching the layers $l\ l'$ together along the finished edge of the outer layer will therefore cause the knife to trim only the inner layer or lining, the upper surface of the lip or guard rubbing harmlessly against the inner surface of the outer layer. The lining is thus evenly trimmed as fast as the stitching progresses, and without the danger of cutting the stitches which attends the use of the hand-tool or welt-awl heretofore used for trimming linings.

It will be seen that the yielding movement of the knife due to the elastic shank enables the knife to be depressed to any desired extent by the downward pressure of the presser-foot upon the outer layer, $l$, so that the knife will conform to the thickness of said outer layer, and is therefore adapted to different grades of work.

The throat-plate $f$ is provided with a convex surface under the presser-foot, and the under side of the presser-foot is also convexed, so that the two surfaces will clamp the work only at and near the point where the needle penetrates it, and the knife acts on the inner layer, the lip or guard projecting forward from the point where the work is clamped, as shown in Fig. 3, so that its entrance between the layers will not be impeded by the presser-foot, and will be attended with the minimum of friction.

$o$ represents a cavity formed in the throat-plate or in the bed of the machine under the knife $a$, to permit the latter to be depressed below the level of the bed, if desired.

To raise the shank $b$ sufficiently above the bed of the machine, I prefer to place beneath it a plate, $p$, which supports the pivot $b'$ of the shank, and is secured to the bed $c$ by screws $q\ q$, passing through enlarged slots $r\ r$, and thereby made adjustable laterally of the shank to enable the edge of the knife to be moved forward to compensate for wear, and lengthwise of the shank to enable the knife to be moved toward or from the wall $i$. If desired, however, the shank $b$ may be pivoted directly to the bed of the machine and bent upwardly or offset at its knife-supporting end.

I prefer to provide a gage or guard, H, to regulate the distance between the outer edge of the outer layer, $l$, and the line of stitching, and therefore the width of the strip $l^2$ trimmed from the lining $l'$ by the knife. (See Figs. 8 and 10.) Said gage projects downwardly from the edge of the presser-foot and over the shank $b$ of the knife, and it may be formed on a spring-arm, H′, attached to the presser-foot, as shown in Fig. 7, or attached to the shank of the knife, as shown in Fig. 8, or formed on the presser-foot, as an integral part thereof, as shown in Fig. 9, or attached to the bed of the machine, as shown in Fig. 10.

The construction of the mechanism for oscillating the shank $b$ will depend upon the construction of the sewing-machine with which the attachment is used. In the present instance a Weed machine is illustrated, and the mechanism used for operating the knife and its shank (shown in Figs. 1, 11, 12, and 13) is composed of a cam, $s$, on the shuttle and feed-operating shaft $t$, a rock-shaft, $u$, journaled in a hanger, V, on the under side of the bed $c$, an arm, $w$, on one end of the rock-shaft engaged with the cam $s$, so as to be oscillated thereby, an arm, A, on the opposite end of the rock-shaft, and a slide, B, pivoted to the outer end of the arm A, and adapted to reciprocate in an orifice in a post or hanger, C, which forms one of the bearings of the shaft $t$. The slide B is provided with a stud, E, projecting upwardly through a slot in the bed of the machine and adapted to enter an orifice in the rear end of the knife-shank, the latter being adapted to be sprung upwardly and disengaged from said stud to enable the knife to be swung on its pivot out of its operative position.

Having thus described my invention, I claim—

1. In a sewing-machine, a reciprocating knife or trimmer projecting from one side of a substantially horizontal stock which is raised above the bed of the machine, whereby the knife is adapted to trim one of two superposed layers of material while said layers are being stitched together, substantially as described.

2. In a sewing-machine, a reciprocating knife or trimmer arranged under the presser-foot, adapted to trim the bottom layer of two superposed layers of material while said layers are being stitched together, and provided with a lip or guard above its cutting-edge, whereby it is prevented from cutting the upper layer, as set forth.

3. In a sewing-machine, a reciprocating knife or trimmer arranged under the presser-foot, adapted to trim the bottom layer of two superposed layers of material while said layers are being stitched together, provided with a lip or guard above its cutting-edge and adapted to yield and thereby conform to the varying thickness of the layers of material, as set forth.

4. In a sewing-machine, the combination of the reciprocating knife arranged under the presser-foot, the elastic pivoted shank carrying said knife and constituting a lip or guard, and a spring for the latter and mechanism for oscillating said shank to reciprocate the knife, substantially as set forth.

5. The improved trimming device having the elastic shank adapted to be pivoted to the bed of the machine and to be connected to driving mechanism, and the knife projecting downwardly from the end of said elastic shank, and thereby adapted to trim the lower one of two superposed layers of material, the end of the shank constituting a lip or guard, and the shank serving as a spring for the knife, as set forth.

6. The combination of the presser-foot, the reciprocating and vertically-yielding knife arranged under the presser-foot and adapted to be depressed by material placed between it and the presser-foot, and the throat-plate having a cavity, o, arranged to permit the depression of the knife, as set forth.

7. The combination of the presser-foot, the reciprocating and vertically-yielding knife arranged under the presser-foot, and the throat-plate having a convex portion to support the work, a side wall or bearing to co-operate with the knife, and a cavity to permit the depression of the knife, as set forth.

8. The combination of the presser-foot, the throat-plate, and the reciprocating knife having the lip or guard projecting forward from the upper portion of its cutting-edge and adapted to insert itself between two layers of material interposed between the foot and throat-plate, said foot and throat-plate having convex bearing-surfaces formed to bear upon said layers only at and near the point where the knife acts without pressing them together in advance of said point, whereby the guard is enabled to insert itself between said layers with the minimum of friction, as set forth.

9. The combination of the shank having the downwardly-projecting trimming-knife and the raised plate supporting the pivot of said shank and adjustable upon the bed of the machine to compensate for wear of the knife, as set forth.

10. In a sewing-machine, the combination of the reciprocating knife having the lip or guard and adapted to trim the under layer of two superposed layers of material, and a gage arranged above said knife and guard to form a stop for the edge of the upper layer of material, substantially as and for the purpose described.

In testimony whereof I have signed my name to this specification in the presence of two subscribing witnesses.

LYMAN L. BARBER.

Witnesses:
ALONZO WARREN,
C. F. BROWN.